(12) United States Patent
Imade (10) Patent No.: US 11,050,100 B2
(45) Date of Patent: Jun. 29, 2021

(54) ASSEMBLED BATTERY

(71) Applicant: TOYOTA JIDOSHA KABUSHIKI KAISHA, Toyota (JP)

(72) Inventor: Yuki Imade, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/459,753

(22) Filed: Jul. 2, 2019

(65) Prior Publication Data

US 2020/0052353 A1 Feb. 13, 2020

(30) Foreign Application Priority Data

Aug. 8, 2018 (JP) .............................. JP2018-149306

(51) Int. Cl.
*H01M 10/6554* (2014.01)
*H01M 10/613* (2014.01)
*H01M 10/615* (2014.01)
*H01M 10/6557* (2014.01)
*H01M 10/6567* (2014.01)
(Continued)

(52) U.S. Cl.
CPC ..... *H01M 10/6554* (2015.04); *H01M 10/613* (2015.04); *H01M 10/615* (2015.04); *H01M 10/625* (2015.04); *H01M 10/653* (2015.04); *H01M 10/6555* (2015.04); *H01M 10/6556* (2015.04); *H01M 10/6557* (2015.04); *H01M 10/6567* (2015.04); *H01M 50/20* (2021.01)

(58) Field of Classification Search
CPC ............. H01M 2/1077; H01M 2/1083; H01M 10/613; H01M 10/615; H01M 10/625; H01M 10/653; H01M 10/6554; H01M 10/6555; H01M 10/6556; H01M 10/6567; H01M 2220/20; H01M 10/6557; H01M 50/209; H01M 50/249; H01M 50/509
See application file for complete search history.

(56) References Cited

U.S. PATENT DOCUMENTS 5,503,948 A * 4/1996 MacKay ................. H01M 2/22
429/152
9,945,098 B2 * 4/2018 Adachi ..................... E02F 3/30
(Continued)

FOREIGN PATENT DOCUMENTS

JP 2004-227788 A 8/2004
JP 2013-045578 A 3/2013

*Primary Examiner* — Gregg Cantelmo
(74) *Attorney, Agent, or Firm* — Oliff PLC (57) ABSTRACT

An assembled battery disclosed herein includes a plurality of battery cells and a plurality of heat transfer plates. The plurality of battery cells are laminated in a prescribed direction. The plurality of heat transfer plates are arranged on both sides in the direction of lamination of each of the plurality of battery cells. As two battery cells adjacent to each other among the plurality of laminated battery cells, two adjacent battery cells connected in series and two adjacent battery cells connected in parallel are included, and an insulating material for insulating the adjacent battery cells from each other is arranged between the two adjacent battery cells connected in series among the two battery cells adjacent to each other but the insulating material is not arranged between the two adjacent battery cells connected in parallel among the two battery cells adjacent to each other.

4 Claims, 5 Drawing Sheets

(51) Int. Cl.
*H01M 10/625* (2014.01)
*H01M 50/20* (2021.01)
*H01M 10/653* (2014.01)
*H01M 10/6556* (2014.01)
*H01M 10/6555* (2014.01)

(56) References Cited

U.S. PATENT DOCUMENTS

| | | | |
|---|---|---|---|
| 9,994,098 B2* | 6/2018 | Ai | B60K 6/383 |
| 2005/0123828 A1* | 6/2005 | Oogami | B60L 58/26 |
| | | | 429/152 |
| 2006/0183017 A1* | 8/2006 | Kanai | H01M 10/4207 |
| | | | 429/120 |
| 2013/0130087 A1* | 5/2013 | Kawaguchi | H01M 10/658 |
| | | | 429/120 |

* cited by examiner

ASSEMBLED BATTERY

BACKGROUND OF THE INVENTION

1. Field of the Invention

The present teaching relates to an assembled battery constructed by laminating a plurality of battery cells. The present application claims priority on the basis of Japanese Patent Application No. 2018-149306 filed in Japan on Aug. 8, 2018, the entire contents of which are incorporated herein by reference.

2. Description of the Related Art

Assembled batteries (also referred to as battery packs) which include a plurality of battery cells (also referred to as cells) are favorably used in vehicle-mounted power supplies and the like. Such an assembled battery may be constructed by alternately laminating flat battery cells and heat transfer plates. In this case, when adjacent battery cells are short-circuited via a heat transfer plate positioned therebetween, sufficient open end voltage cannot be obtained. For example, an assembled battery described in Japanese Patent Application Publication No. 2004-227788 seeks to suppress short circuits via a heat transfer plate by arranging heat transfer plates whose surfaces have been subjected to insulation treatment so as to contact with both surfaces of each battery cell (lithium ion battery).

SUMMARY OF THE INVENTION

In the assembled battery described in Japanese Patent Application Publication No. 2004-227788, an insulation treatment (for example, a treatment to form an insulating film) is applied to a surface of a heat transfer plate. However, when the insulation treatment of the surface is defective (for example, when there is a breakage in an insulating film or the like), it is difficult to reliably prevent short circuits via the heat transfer plate. While a portion subjected to the insulation treatment may conceivably be made thicker in order to increase accuracy of short-circuit prevention, increasing a thickness of a heat transfer plate itself results in increasing a thickness of the entire assembled battery in a direction of lamination and is therefore not favorable.

In consideration thereof, a typical object of the present teaching is to provide an assembled battery capable of appropriately suppressing a drop in open end voltage due to a short circuit between battery cells via a heat transfer plate without increasing a thickness of an entire assembled battery in a direction of lamination.

In order to achieve the object described above, an assembled battery according to an aspect disclosed herein includes: a plurality of battery cells laminated in a prescribed direction; and heat transfer plates arranged on both sides in the direction of lamination of each of the plurality of battery cells, wherein, as two battery cells adjacent to each other among the plurality of laminated battery cells, two adjacent battery cells connected in series and two adjacent battery cells connected in parallel are included, and an insulating material for insulating the adjacent battery cells from each other is arranged between the two adjacent battery cells connected in series among the two battery cells adjacent to each other but the insulating material is not arranged between the two adjacent battery cells connected in parallel among the two battery cells adjacent to each other.

In the assembled battery configured as described above, the insulating material is arranged between adjacent battery cells which are adjacent to each other and which are connected in series but the insulating material is not arranged between adjacent battery cells which are connected in parallel. In other words, the insulating material is only arranged between adjacent battery cells connected in series for which a short circuit via the heat transfer plate becomes a problem. Therefore, compared to a case where the insulating material is arranged between all battery cells, an increase in thickness of the entire assembled battery in the direction of lamination can be readily suppressed. In addition, compared to a case where an insulation treatment is only applied to a surface of the heat transfer plate or the like, a short circuit between adjacent battery cells connected in series can be prevented with high accuracy. As a result, a drop in open end voltage due to a short circuit between battery cells via a heat transfer plate can be appropriately suppressed.

In a more desirable aspect of the assembled battery disclosed herein, the battery cell is not provided between the two heat transfer plates positioned on both sides of the insulating material in the direction of lamination.

According to this configuration, compared to a case where a battery cell is provided together with the insulating material between two heat transfer plates (in other words, a case where the insulating material is arranged on a first side surface in the direction of lamination of the battery cell and the heat transfer plate is arranged on a second side surface in the direction of lamination of the battery cell), each of the plurality of battery cells can be cooled more uniformly.

In another desirable aspect of the assembled battery disclosed herein, when a heat capacity of the battery cell is denoted by Cc, a heat capacity Ci of the insulating material arranged between the two battery cells that are adjacent to each other satisfies $0.94Cc \leq Ci \leq 1.06Cc$. In this case, a temperature of the heat transfer plates arranged on both sides of the battery cell and a temperature of the heat transfer plates arranged on both sides of the insulating material become uniform more readily. Therefore, supercooling and insufficient cooling of a part of the battery cells are less likely to occur.

In another desirable aspect of the assembled battery disclosed herein, the insulating material is provided with a casing having therein a housing portion capable of housing a substance. In this case, by allowing the housing portion of the casing to house an appropriate substance, at least any of a heat capacity and a shape of the insulating material can be readily adjusted. For example, by allowing the housing portion of the casing to house an appropriate amount of an appropriate substance in order to approximate the heat capacity of the insulating material and the heat capacity of the battery cells to each other, occurrences of supercooling and insufficient cooling of a part of the battery cells can be more highly suppressed.

The substance to be housed in the housing portion of the casing of the insulating material can be selected as appropriate and may be any of a solid, a liquid, a gel-like substance, and the like. For example, a same substance as at least a part of substances used in an electrolyte of the battery cell may be housed in the housing portion of the insulating material. In this case, the heat capacity of the insulating material and the heat capacity of the battery cell can be more readily approximated to each other. For example, when the battery cell is an all solid-state battery, a solid electrolyte used in the battery cell may be housed in the housing portion of the insulating material. In addition, when the electrolyte of the battery cell is a liquid, a solvent in a state prior to adding a supporting salt may be housed in the housing portion of the insulating material. Furthermore, a ceramic powder (such as alumina powder) may be housed in the housing portion of the insulating material.

DESCRIPTION OF THE PREFERRED EMBODIMENT

Hereinafter, a typical embodiment in the present disclosure will be described in detail with reference to the drawings. With the exception of matters specifically mentioned in the present specification, matters required to carry out the present teaching can be understood to be design matters of a person with ordinary skill in the art based on the prior art in the relevant technical field. The present teaching can be carried out based on the contents disclosed in the present specification and common general technical knowledge in the relevant field. It should be noted that, in the following drawings, members and portions that produce same effects will be described using the same reference characters. It should also be noted that dimensional relationships (a length, a width, a thickness, and the like) shown in the respective drawings do not reflect actual dimensional relationships.

In the present specification, a "battery" is a term which describes power storage devices from which electric energy can be extracted in general and is a concept including both primary batteries and secondary batteries. A "secondary battery" refers to repetitively chargeable/dischargeable power storage devices in general and encompasses so-called storage batteries (in other words, chemical batteries) such as a lithium ion secondary battery, a nickel hydride battery, and a nickel-cadmium battery as well as capacitors (in other words, physical batteries) such as an electrical double layer capacitor.

Overall Configuration

Figure 1:
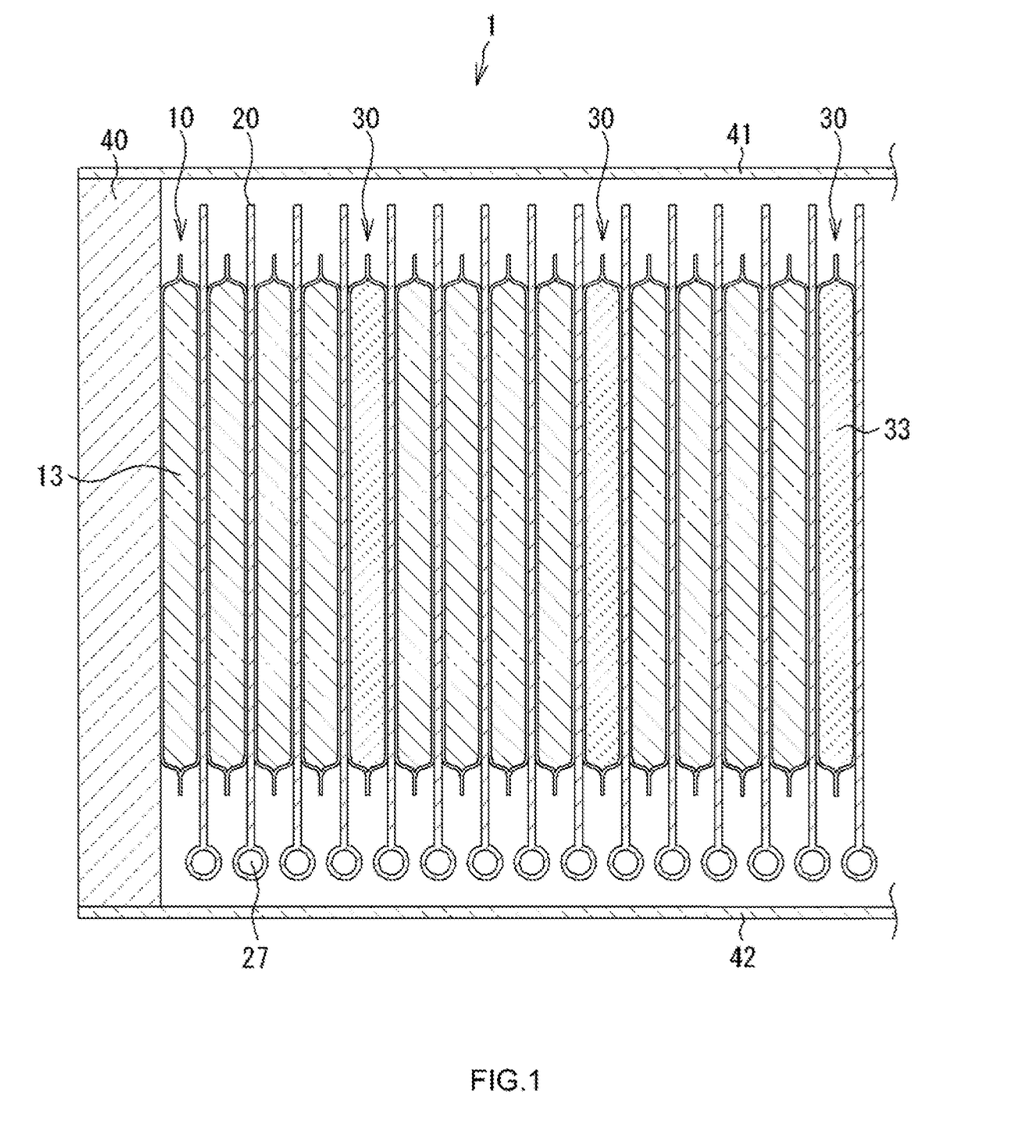
FIG. 1 is a longitudinal sectional view of a part of an assembled battery 1 according to an embodiment.

An overall configuration of an assembled battery 1 according to the present embodiment will be described with reference to FIG. 1. FIG. 1 is a longitudinal sectional view of a part of the assembled battery 1 (more specifically, a first end in a direction of lamination of a plurality of battery cells 10 constituting the assembled battery 1). The assembled battery 1 includes a plurality of battery cells 10. Each battery cell 10 is formed in a flat shape (in the present embodiment, an approximately rectangular plate shape). The plurality of flat battery cells 10 are laminated in a prescribed direction of lamination (a left-right direction in FIG. 1). Although details will be provided later, the plurality of battery cells 10 are electrically connected to each other. In addition, a configuration of each battery cell 10 will also be described later with reference to FIG. 2.

Heat transfer plates 20 for adjusting a temperature of the battery cell 10 are arranged on both sides in the direction of lamination of each of the plurality of battery cells 10. The heat transfer plate 20 has a plate shape, and a plate surface of the heat transfer plate 20 and a wide side surface of the plate-shaped battery cell 10 opposing the heat transfer plate 20 are in contact with each other. In the example shown in FIG. 1, a constraining plate 40 with high thermal conductivity is arranged in place of the heat transfer plate 20 on a further outer side of the battery cell 10 (in the example shown in FIG. 1, a leftmost battery cell 10) positioned on an outermost side among the plurality of battery cells 10. As a result, since the constraining plate 40 may also function as a heat transfer plate, the battery cell 10 positioned on an outermost side in the direction of lamination is also cooled in a favorable manner. However, the heat transfer plate 20 may also be arranged on a further outer side of the battery cell 10 positioned on an outermost side. Details of a configuration of each heat transfer plate 20 will be provided later with reference to FIG. 3.

An insulating material 30 is arranged at a specific position between the plurality of battery cells 10. The insulating material 30 insulates adjacent battery cells 10 from each other. More specifically, the insulating material 30 suppresses an occurrence of a short circuit between adjacent battery cells 10 via the heat transfer plate 20 positioned between the adjacent battery cells 10. Details of a configuration of the insulating material 30 will be provided later with reference to FIG. 4. In addition, an arrangement relationship among the insulating material 30, the battery cell 10, and the heat transfer plate 20 will be described later with reference to FIG. 5.

The constraining plate 40 is arranged at both ends in the direction of lamination of the battery cells in the assembled battery 1 and the constraining plates 40 at both ends constitute a pair (only a first constraining plate 40 is illustrated in FIG. 1). Fastening members 41 and 42 are attached to each of the pair of constraining plates 40. A total of two fastening members 41 and 42 are used in the present embodiment. The fastening member 41 in an upper part in FIG. 1 connects a side surface of the first constraining plate 40 being illustrated and a corresponding side surface of a second constraining plate not being illustrated to each other. The fastening member 42 in a lower part in FIG. 1 connects the pair of constraining plates 40 at both ends in the direction of lamination of the battery cells in a similar manner to the fastening member 41 on a side surface on an opposite side as viewed from the side surface on which the fastening member 41 is arranged. By fastening each of the fastening members 41 and 42 to the constraining plate 40 by screws or the like, the plurality of laminated battery cells 10 are constrained in the direction of lamination by a prescribed constraint load.

Battery Cell

Figure 2:
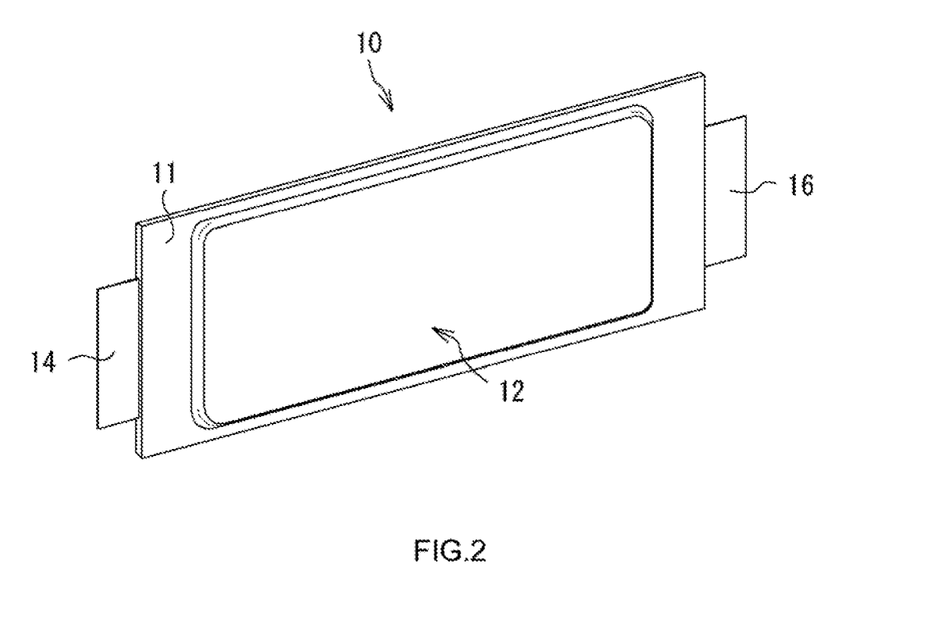
FIG. 2 is a perspective view of a battery cell 10 according to the embodiment.

The battery cell 10 according to the present embodiment will be described with reference to FIG. 2. Each battery cell 10 independently functions as a secondary battery. The battery cell 10 includes a battery case 11, a power generation element 13 (refer to FIG. 1), a positive electrode terminal 14, and a negative electrode terminal 16.

The battery case 11 forms a power generation element housing portion 12 for housing the power generation element 13. As an example, a laminated film with moderate flexibility is used as the battery case 11 according to the present embodiment. In other words, the battery cell 10 according to the present embodiment is a laminated cell in which a power generation element is housed by a laminated film. However, a material of the battery case 11 can also be changed. For example, a battery case (for example, a flat hexahedral box-shaped case) made of a metal or a resin with moderate rigidity may be used.

The power generation element housing portion 12 with a bag shape is formed inside the battery case 11 according to the present embodiment by pasting together outer peripheral portions of two sheets of the laminated film. An external shape of the battery case 11 is an approximately rectangular plate shape. An external shape of the power generation element housing portion 12 has an approximately rectangular plate shape whose outer periphery is slightly smaller than an outer periphery of the battery case 11. In addition, the battery case 11 according to the present embodiment has a laminate structure in which a plurality of layers are laminated. More specifically, the battery case 11 according to the present embodiment has a nylon layer, an aluminum layer, and a polypropylene layer. The nylon layer constitutes an outermost layer of the battery case 11. The nylon layer functions as an insulating layer that insulates the power generation element 13 housed in the power generation element housing portion 12 from the outside and, at the same time, increases endurance and impact resistance of the battery case 11. The aluminum layer increases a gas barrier property and a moisture-proof property of the battery case 11. The polypropylene layer is a sealant layer for imparting heat sealability to the battery case 11.

The power generation element 13 (refer to FIG. 1) includes an electrode body and an electrolyte. The battery cell 10 according to the present embodiment is desirably a secondary battery with high energy density among various batteries, and an example of a particularly desirable secondary battery is a lithium ion battery. However, the battery cell 10 may be a secondary battery other than a lithium ion battery (for example, a nickel-hydrogen battery). In addition, the battery cell 10 according to the present embodiment is an all solid-state battery in which an electrolyte solution is substituted with a solid electrolyte. However, the battery cell 10 need not be an all solid-state battery and an electrolyte solution may be included in the power generation element 13.

In the power generation element 13 according to the present embodiment, a positive electrode current collector layer, a positive electrode active material layer, a solid electrolyte layer, a negative electrode active material layer, and a negative electrode current collector layer are laminated in order. An arbitrary current collector layer can be used as the positive electrode current collector layer and the negative electrode current collector layer. For example, current collector layers made of various metals such as silver, copper, gold, aluminum, nickel, iron, stainless steel, and titanium can be used. The positive electrode active material layer includes a positive electrode active material and, optionally, a conductive aid, a binder, and solid electrolyte particles. Examples of the positive electrode active material include metal oxides containing lithium and at least one transition metal selected from the group consisting of manganese, cobalt, nickel, and titanium (for example, lithium cobalt oxide, lithium nickel oxide, and lithium nickel cobalt manganese oxide). A material usable as a solid electrolyte of an all solid-state battery can be used in the solid electrolyte layer. For example, sulfide-based amorphous solid electrolyte particles such as $8Li_2O \cdot 67Li_2S \cdot 25P_2S_5$, $Li_2S$, $P_2S_5$, $Li_2S$—$SiS_2$, $LiI$—$Li_2S$—$SiS_2$, $LiI$—$Li_2S$—$P_2S_5$, or $LiI$—$Li_2S$—$B_2S_3$, oxide-based amorphous solid electrolyte particles such as $Li_2O$—$B_2O_3$—$P_2O_5$ or $Li_2O$—$SiO_2$, or an crystalline oxide such as $Li_{1.3}Al_{0.3}Ti_{0.7}(PO_4)_3$ or $Li_{1+x+y}A_xTi_{2-x}Si_yP_{3-y}O_{12}$ (where A is Al or Ga, $0 \leq x \leq 0.4$, and $0 < y \leq 0.6$) can be used. The negative electrode active material layer includes a negative electrode active material and, optionally, a conductive aid, a binder, and solid electrolyte particles. The negative electrode active material is not particularly limited as long as the negative electrode active material is capable of storing and releasing metal ions such as lithium ions. In the present embodiment, the negative electrode active material contains Si.

The positive electrode terminal 14 and the negative electrode terminal 16 extend outward from inside the battery case 11. The positive electrode terminal 14 is electrically connected inside the battery case 11 to the positive electrode current collector layer. The negative electrode terminal 16 is electrically connected inside the battery case 11 to the negative electrode current collector layer. In the present embodiment, the positive electrode terminal 14 and the negative electrode terminal 16 respectively extend outward in different directions from a first end and a second end in a long-side direction of the battery case 11 with an approximately rectangular plate shape. However, the configurations of the positive electrode terminal 14 and the negative electrode terminal 16 can also be changed. For example, both the positive electrode terminal 14 and the negative electrode terminal 16 may be provided together at the first end in the long-side direction of the battery case 11.

Heat Transfer Plate

Figure 3:
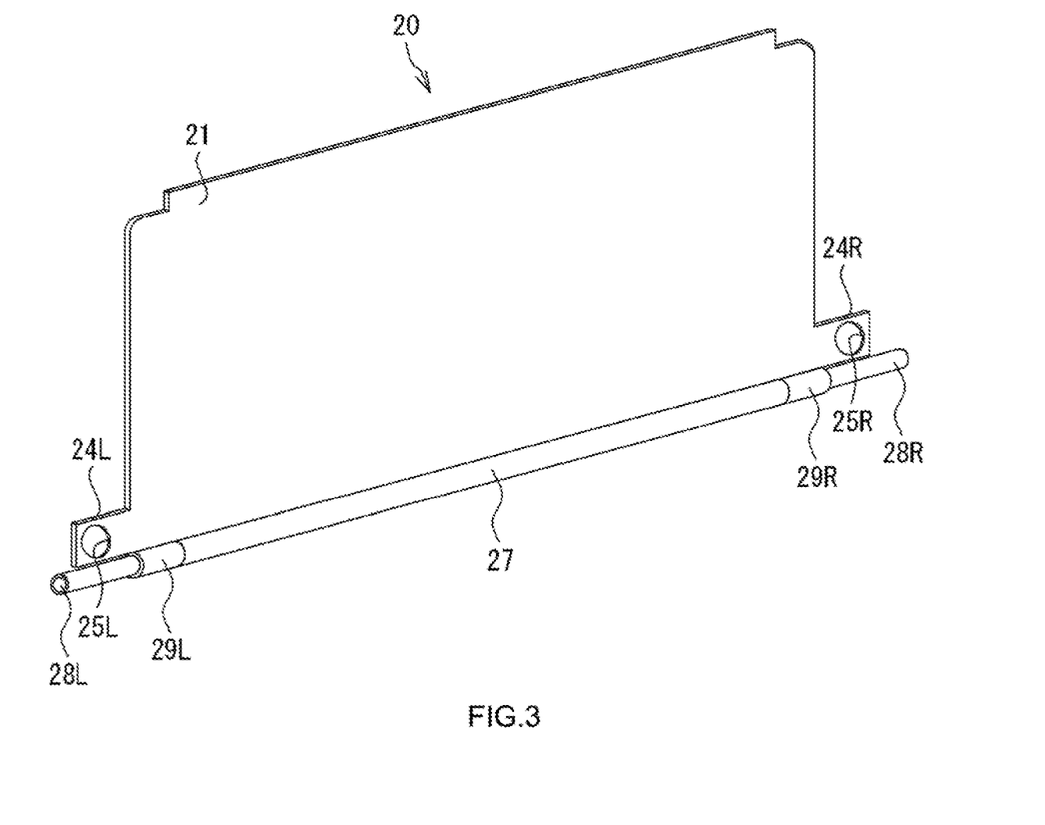
FIG. 3 is a perspective view of a heat transfer plate 20 according to the embodiment.

The heat transfer plate 20 according to the present embodiment will be described with reference to FIG. 3. The heat transfer plate 20 according to the present embodiment includes a main body portion 21 with an approximately rectangular plate shape. When the heat transfer plate 20 is assembled to the assembled battery 1, a plate surface of the main body portion 21 comes into surface contact with a plate surface of the battery cell 10 (in the present embodiment, an outer surface of the power generation element housing portion 12 in the battery case 11).

A holding portion 24L is provided at a first end in a long-side direction of the main body portion 21. A through-hole 25L penetrating in a direction perpendicular to the plate surface is formed in the holding portion 24L. In addition, a holding portion 24R is provided at a second end in the long-side direction of the main body portion 21. A through-hole 25R penetrating in a direction perpendicular to the plate surface is formed in the holding portion 24R. By inserting a holding shaft (not illustrated) into each of the through-holes 25L and 25R, movement of the heat transfer plate 20 in a direction intersecting the direction of lamination is restricted.

As illustrated, the heat transfer plate 20 includes a coolant flow channel 27 which allows passage of a coolant (for example, water). As an example, the coolant flow channel 27 according to the present embodiment is formed along a first long-side portion (in FIG. 3, a lower end) of the main body portion 21 having an approximately rectangular plate shape so as to extend in the long-side direction while coming into contact with the main body portion 21. When the coolant passes through the coolant flow channel 27, a temperature of the entire heat transfer plate 20 drops. In the present embodiment, the main body portion 21 and the coolant flow channel 27 are integrally formed. Alternatively, the main body portion 21 and the coolant flow channel 27 may be constituted by different members. In addition, a configuration of the coolant flow channel 27 can also be changed. For example, a coolant flow channel may be formed inside the main body portion 21 having a certain thickness or more.

Furthermore, the coolant flow channel need not extend in a straight line and may be bent. For example, the coolant flow channel may be provided so as to follow an outer peripheral end of the main body portion 21.

Coolant tubes 28L and 28R are connected via joints 29L and 29R to each of both ends in the long-side direction of the coolant flow channel 27. A coolant supplied from a cooler (not illustrated) can be caused to flow into the coolant flow channel 27 via the coolant tubes 28L and 28R.

In the heat transfer plate 20, at least the main body portion 21 is formed of a substance (for example, aluminum or copper) with high thermal conductivity. In the present embodiment, the main body portion 21 and the coolant flow channel 27 are integrally formed by a metallic material with high thermal conductivity. Subsequently, the joints 29L and 29R are mounted to both ends of the coolant flow channel 27, and the coolant tubes 28L and 28R are mounted to the joints 29L and 29R.

Insulating Material

Figure 4:
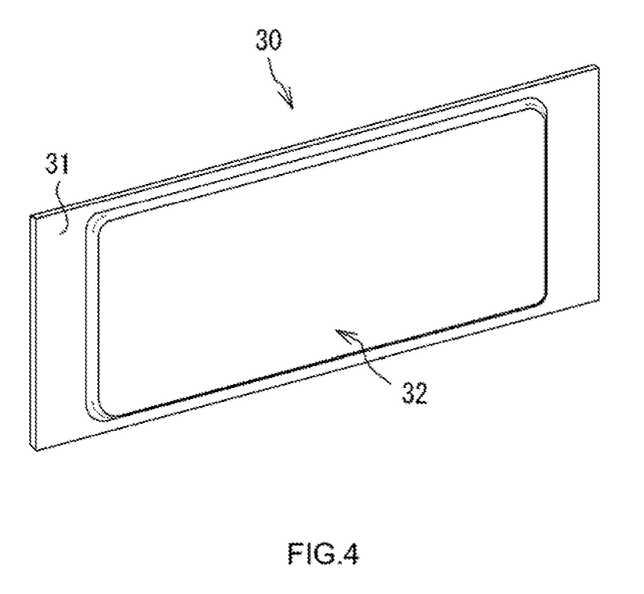
FIG. 4 is a perspective view of an insulating material 30 according to the embodiment.

The insulating material 30 according to the present embodiment will be described with reference to FIG. 4. The insulating material 30 suppresses occurrences of a short circuit between adjacent battery cells 10 via the heat transfer plate 20. The insulating material 30 according to the present embodiment has an approximately rectangular plate shape that approximates the shape of the battery cell 10 (refer to FIG. 2).

The insulating material 30 according to the present embodiment includes a casing 31 having inside a housing portion 32 capable of housing a substance. As an example, a laminated member is used for the casing 31 according to the present embodiment in a similar manner to the battery case 11 of the battery cell 10. In other words, inside the casing 31 according to the present embodiment, the housing portion 32 with a bag shape is formed by pasting together outer peripheral portions of two sheets of the laminate. An external shape of the housing portion 32 has an approximately rectangular plate shape whose outer periphery is slightly smaller than an outer periphery of the casing 31. In the casing 31, at least a layer positioned outermost is formed by a member having a high insulating property. For example, nylon or the like with a high insulating property, high endurance, and high impact resistance may be used as the outermost layer of the casing 31.

A housed substance 33 (refer to FIG. 1) is housed inside the housing portion 32. A material, a housing amount, and the like of the housed substance 33 can be appropriately selected in accordance with various conditions. For example, the material and the housing amount of the housed substance 33 may be determined in order to adjust at least any of a heat capacity and a shape of the insulating material 30. The housed substance 33 may be any of a solid, a liquid, a gel-like substance, and the like or may be a mixture of a plurality of substances. For example, a same substance as at least a part of substances used in the power generation element 13 of the battery cell 10 may be used as the housed substance 33. In the present embodiment, a solid electrolyte used in the power generation element 13 may be used as the housed substance 33. In this case, the heat capacity of the insulating material 30 and the heat capacity of the battery cell 10 can be more readily approximated to each other. In addition, at least any of ceramic powders (for example, alumina powder) and the like or a mixture thereof may be used as the housed substance 33.

As described above, the insulating material 30 according to the present embodiment has a shape that approximates the shape of the battery cell 10. In addition, the insulating material 30 according to the present embodiment internally houses a substance in a similar manner to the battery cell 10. In other words, the insulating material 30 according to the present embodiment can also be described a dummy cell which has a structure similar to that of the battery cell 10 but which does not have functionality as a secondary battery.

However, a configuration of the insulating material can be changed. For example, a plate-shaped member constituted by a member of which at least a surface has a high insulating property may be used as the insulating material. In addition, in the present embodiment, one insulating material 30 is arranged between a pair of heat transfer plates 20. However, an insulating material constituted by a plurality of members may be arranged between a pair of heat transfer plates 20. For example, an insulating material may be arranged at each of four corners of a pair of heat transfer plates 20 with an approximately rectangular plate shape.

Figure 5:
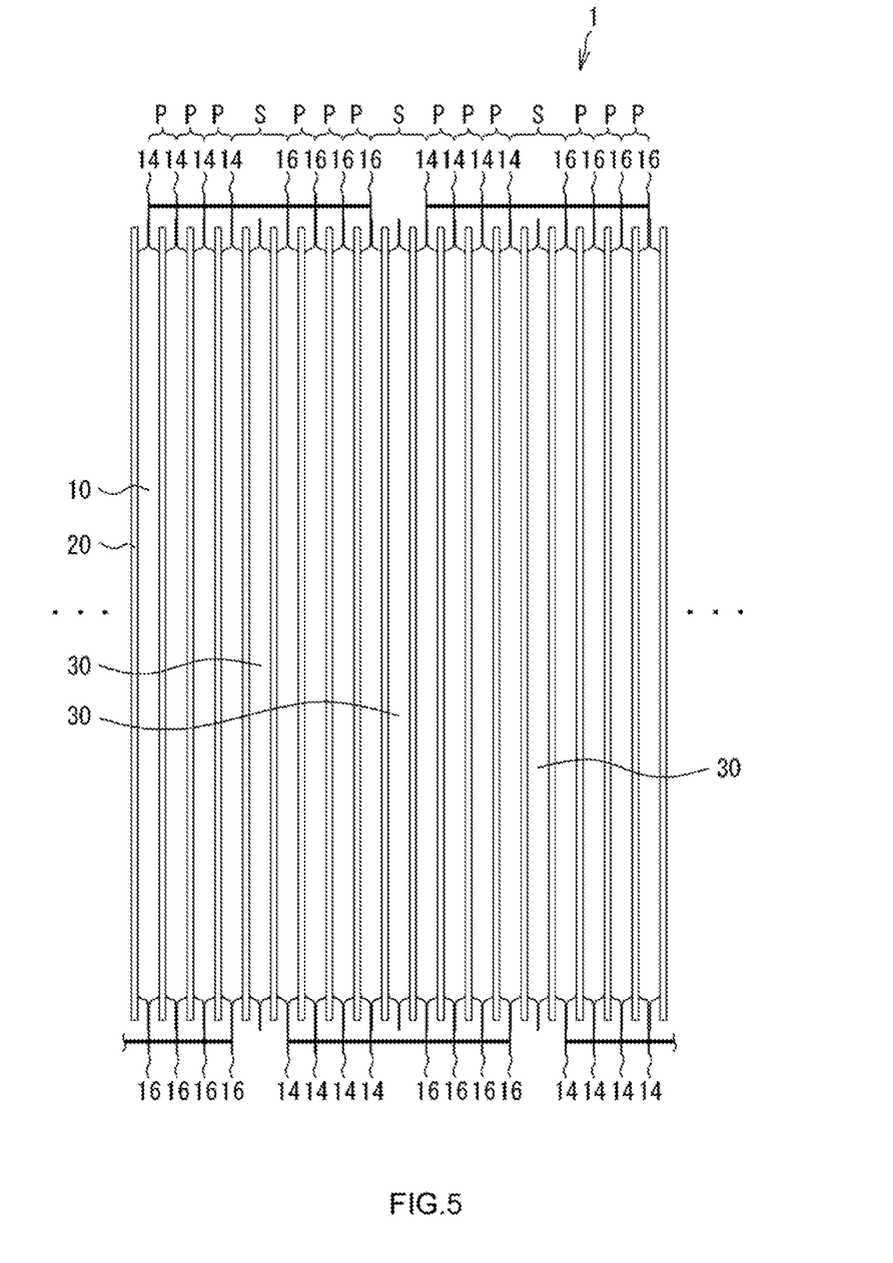
FIG. 5 is an explanatory diagram for explaining electrical connections (a serial connection and a parallel connection) of a plurality of battery cells 10 constituting the assembled battery 1.

Arrangement Relationship of Insulating Material, Battery Cell, and Heat Transfer Plate An arrangement relationship among the insulating material 30, the battery cell 10, and the heat transfer plate 20 will now be described with reference to FIG. 5. First, an electrical connection of the plurality of battery cells 10 in the assembled battery 1 will be described. FIG. 5 is a diagram of a part of the assembled battery 1 as viewed from above in order to schematically show an electrical connection system of the plurality of battery cells 10. In the assembled battery 1, as two battery cells adjacent to each other among the plurality of battery cells 10, two adjacent battery cells connected in series (indicated by "S" in the diagram) and two adjacent battery cells connected in parallel (indicated by "P" in the diagram) is included.

In an example shown in FIG. 5, first to fourth and ninth to twelfth battery cells 10 from a left side of the diagram are arranged so that the positive electrode terminal 14 is positioned on an upper side of the diagram and the negative electrode terminal 16 is positioned on a lower side of the diagram. In addition, fifth to eighth and thirteenth to sixteenth battery cells 10 from the left side of the diagram are arranged so that the positive electrode terminal 14 is positioned on the lower side of the diagram and the negative electrode terminal 16 is positioned on the upper side of the diagram. Furthermore, the first to fourth positive electrode terminals 14 from the left side of the diagram are electrically connected by a busbar and, at the same time, the first to fourth negative electrode terminals 16 from the left side of the diagram are electrically connected by a busbar. As a result, the first to fourth battery cells 10 from the left side are connected in parallel. In a similar manner, the fifth to eighth battery cells 10 from the left side of the diagram, the ninth to twelfth battery cells 10 from the left side of the diagram, and the thirteenth to sixteenth battery cells 10 from the left side of the diagram are also connected in parallel. Furthermore, the first to fourth positive electrode terminals 14 from the left side of the diagram are electrically connected to the fifth to eighth negative electrode terminals 16 from the left side of the diagram. As a result, a connection between the fourth battery cell 10 from the left side of the diagram and the fifth battery cell 10 adjacent thereto is a serial connection. In a similar manner, a connection between the eighth battery cell 10 from the left side of the diagram and the ninth battery cell 10 adjacent thereto is also a serial connection. In addition, a connection between the twelfth battery cell 10 from the left side of the diagram and the thirteen battery cell 10 adjacent thereto is also a serial connection. It is needless to say that the number of battery cells 10 to be connected in parallel is not limited to four.

In the assembled battery 1 according to the present embodiment, the insulating material 30 is only arranged between two adjacent battery cells which are adjacent to each other and which are connected in series S. Meanwhile, the insulating material 30 is not arranged between two adjacent battery cells which are adjacent to each other and which are connected in parallel P. In other words, the insulating material 30 is only arranged between adjacent battery cells connected in series S for which a short circuit via the heat transfer plate 20 becomes a problem. Therefore, compared to a case where the insulating material 30 is arranged between all battery cells, the thickness of the entire assembled battery 1 in the direction of lamination (the left-right direction in FIGS. 1 and 5) can be reduced. In addition, compared to a case where an insulation treatment is only applied to the surface of the heat transfer plate 20, a short circuit via the heat transfer plate 20 can be suppressed with high accuracy.

In addition, as shown in FIG. 5, the battery cell 10 is not provided between two heat transfer plates 20 positioned on both sides (the left side and the right side in FIG. 5) of the insulating material 30 in the direction of lamination. Supposing that the battery cell 10 is provided together with the insulating material 30 between two heat transfer plates 20, a difference in a degree of cooling of the battery cell 10 is created between a portion where the battery cell 10 is provided together with the insulating material 30 between two heat transfer plates 20 and a portion where only the battery cell 10 is provided between two heat transfer plates 20. In comparison, with the assembled battery 1 according to the present embodiment, each of the plurality of battery cells 10 is more readily cooled in a uniform manner.

Relationship between Heat Capacity of Battery Cell and Heat Capacity of Insulating Material In the present embodiment, when a heat capacity of one battery cell 10 is taken as Cc, a heat capacity Ci of one insulating material 30 (specifically, the insulating material 30 arranged between a pair of heat transfer plates 20 that are adjacent to each other) satisfies 0.94Cc≤Ci≤1.06 Cc. Therefore, a temperature of the heat transfer plates 20 arranged on both sides of the battery cell 10 and a temperature of the heat transfer plates 20 arranged on both sides of the insulating material 30 become uniform more readily. As a result, supercooling and insufficient cooling of a part of the battery cells 10 are less likely to occur.

An example of a calculation method of respective heat capacities of the insulating material 30 and the battery cell 10 will now be described. First, specific heat H of an object (the insulating material 30 or the battery cell 10) is measured. An adiabatic method or the like can be adopted as an example of a measurement method of the specific heat H. In an adiabatic method, in a state where the object is immersed in a heat transfer medium (for example, water) inside a heat-insulated container and a temperature of the heat transfer medium has propagated inside the object, an initial temperature Ti of the object and the heat transfer medium is measured. In this case, since the temperature of the object is equal to the temperature of the heat transfer medium, the measured initial temperature Ti may be the temperature of the object or the temperature of the heat transfer medium. Next, a certain amount of heat is applied to the heat transfer medium by a heater installed in the heat-insulated container, and a surface temperature Tt of the object and a temperature Ts of the heat transfer medium are measured. The specific heat H of the object is calculated based on a formula of conservation of heat presented in (Expression 1) below. Next, a heat capacity of the object is calculated by multiplying a mass Mt of the object by the specific heat H. In (Expression 1), Q denotes power (W) of the heater, t denotes a heating time (seconds) by the heater, Ms denotes a mass (g) of the heat transfer medium, and Hs denotes specific heat of the heat transfer medium.

$$Q \cdot t = Ms \cdot Hs \cdot (Ts - Ti) + Mt \cdot H \cdot (Tt - Ti) \qquad \text{(Expression 1)}$$

What is claimed is:

1. An assembled battery, comprising:
a plurality of battery cells laminated in a prescribed direction; and
heat transfer plates arranged on both sides of each of the plurality of battery cells laminated in the prescribed direction of lamination, wherein
the plurality of laminated battery cells includes two adjacent battery cells connected in series and two adjacent battery cells connected in parallel are included, and
an insulating material is arranged between the two adjacent battery cells connected in series among the plurality of battery cells but the insulating material is not arranged between the two adjacent battery cells connected in parallel among the plurality of battery cells.

2. The assembled battery according to claim 1, wherein the insulating material, arranged between the two adjacent battery cells connected in series, resides between two adjacent heat transfer plates and there is no battery cell provided between the two adjacent heat transfer plates.

3. The assembled battery according to claim 2, wherein when a heat capacity of a battery cell of the plurality of battery cells is taken as Cc, a heat capacity Ci of the insulating material arranged between the two adjacent battery cells connected in series satisfies 0.94Cc≤Ci≤1.06Cc.

4. The assembled battery according to claim 1, wherein the insulating material is provided with a casing having therein a housing portion capable of housing a substance.

* * * * *